Dec. 3, 1968 F. W. WELLS 3,414,886

INFORMATION TRANSFER INTO A WORD-ADDRESSED MEMORY

Filed June 24, 1965 2 Sheets-Sheet 1

INVENTOR
FRANK W. WELLS

BY Christie, Parker & Hale
ATTORNEYS

Dec. 3, 1968 F. W. WELLS 3,414,886

INFORMATION TRANSFER INTO A WORD-ADDRESSED MEMORY

Filed June 24, 1965 2 Sheets-Sheet 2

INVENTOR.
FRANK W WELLS
BY Christie, Parker & Hale
ATTORNEYS.

United States Patent Office 3,414,886

Patented Dec. 3, 1968

3,414,886

INFORMATION TRANSFER INTO A WORD-ADDRESSED MEMORY

Frank W. Wells, Pasadena, Calif., assignor to Burroughs Corporation, Detroit, Mich., a corporation of Michigan Filed June 24, 1965, Ser. No. 466,723
10 Claims. (Cl. 340—172.5)

ABSTRACT OF THE DISCLOSURE

An improved memory system for transferring bits stored on a punched card into a word-addressed memory whereby updated characters are written into the memory as each row of the card is scanned and only a single memory cycle is needed for the updating of each character. During the scan of each card row, information bits previously stored in predetermined addresses of memory are transferred to particular bit positions of an information register and bits sequentially received from a card reader are transferred to the succeeding bit position of the register, both during the "read time" of respective memory cycles. The updated characters are then written into the predetermined addresses during the "write time" of the same memory cycles.

Figure 1:
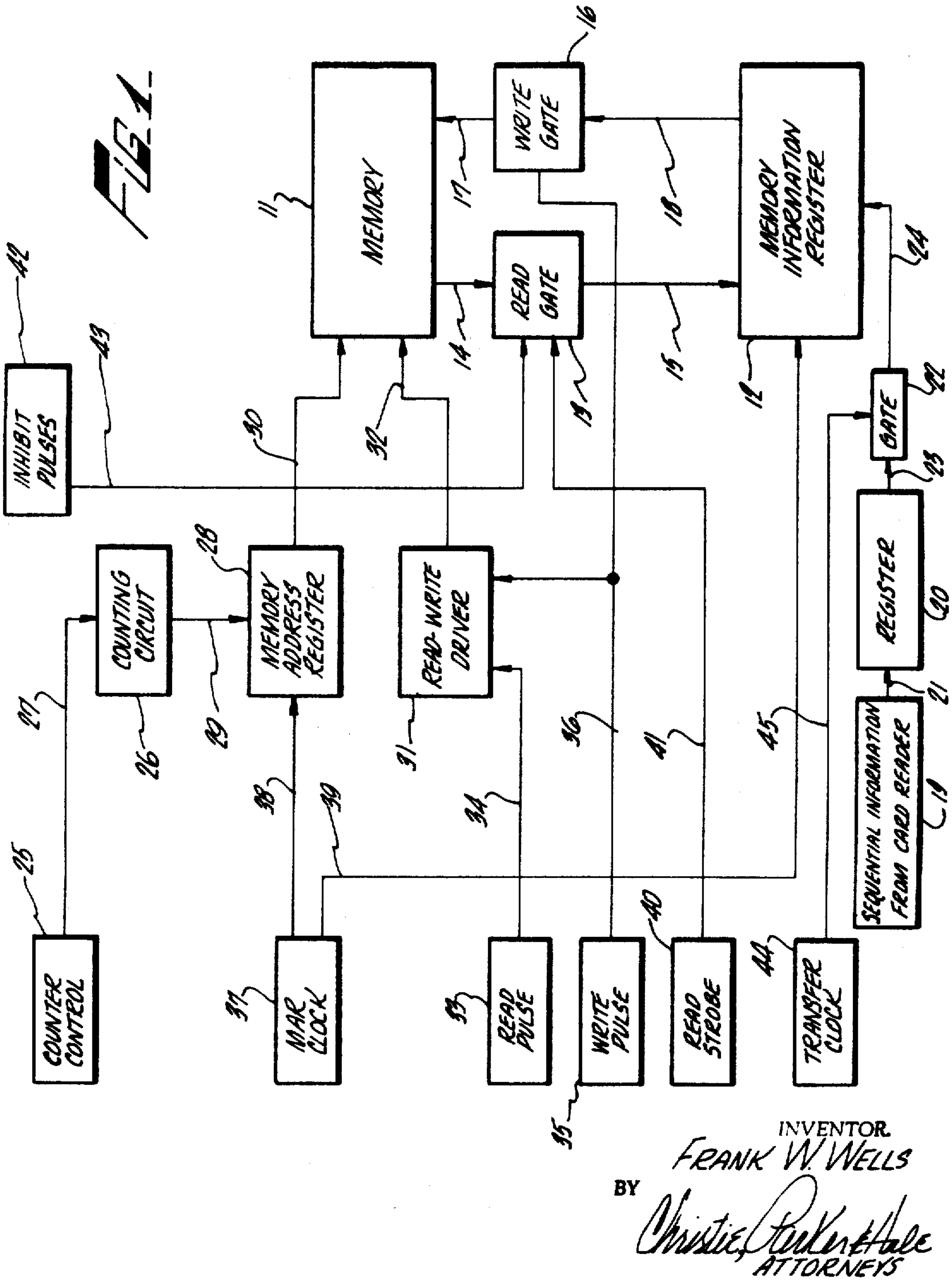

This invention relates to digital data processors and, more particularly, to an improved method for transferring information stored in punched form into a magnetic core memory and means for implementing the method.

Punched cards are widely used as an input-output device by means of which communication is achieved between a data processor and the outer world. Data and instructions are inserted into the machine via the punched cards. A typical card has 12 rows and 80 columns with 80 twelve-bit characters being stored on each card. The characters stored on the card in the form of punched holes must be transferred to a memory within the processor itself.

Most card readers are electromechanical devices which read the information punched into a card by converting the presence or absence of a hole into an electrical signal, representing a binary "1" or "0," respectively. Generally, the card is moved lengthwise across a number of "read brushes" which read information from the card a row at a time. As a result, a sequence of electrical signals is presented wherein the signals are representative of all the bits stored on the card but the order of presentation is such that the bits stored on the card are read out a row at a time. Since a character is stored in each column of the card, signals representing a single character will be separated by a number of signals equal to the number of other characters stored in the card. For example, if 80 twelve-bit characters are stored on the card, a sequence of 960 signals will be presented wherein successive signals defining a single character will be separated by 79 intervening signals. Thus, the 1st, 81st, 161st, etc., concluding with the 881st signal, will all relate to a single character.

During subsequent operations of the processor, such twelve-bit characters must be easily available from a magnetic core memory within which they are stored. While it would be possible to store the 960 bits into the memory in the order in which the signals are received and let subsequent unscrambling be handled by programming methods, such a procedure would require a large number of memory cycles during such unscrambling and is therefore unsatisfactory.

Another solution would be to utilize a memory which is addressable by bit and perform 960 memory write cycles but this is not practical from a cost standpoint and would limit the memory cycle times obtainable.

It would be possible to utilize a 960 bit flip-flop buffer register into which the 960 signals representing the card image are transferred and from which 80 twelve-bit characters could be written into memory. This solution, however, is unsatisfactory from the standpoint both of cost and of the amount of space which would be required.

Another solution would be to write 80 twelve-bit characters into the memory during the scan of the first card row with one bit of each character corresponding to the bit sent from the card reader and the other 11 set to "0." During the scan of the next and succeeding rows, a first memory cycle is utilized to read from memory the character previously stored and to transfer it to a register into which the new bit is added. Thereafter a second memory cycle is utilized to write the updated character into the memory. This method is known in the art and is feasible from both a cost and space viewpoint but has the disadvantage of requiring a large number of memory cycles. Thus, for 80 twelve-bit characters $12\times 80$ write cycles plus $11\times 80$ read cycles for a total of 1840 memory cycles per card would be required.

An advantage of the present invention is that it provides for the assembly of a character in a magnetic core memory via a series of bit writes which do not destroy bits previously written.

Another advantage of the present invention is that it provides for the assembly of a character in a magnetic core memory via a series of bit writes which require fewer memory cycles than heretofore required.

Another advantage of the present invention is that it provides an improved method of transferring data from punched cards into the memory of a data processor.

Another advantage of the present invention is that it provides an improved means for transferring data from punched cards into the memory of a data processor.

The preceding and other advantages of the present invention are achieved in a data processor in which operations conventionally restricted to separate memory cycles are performed within a single cycle, thereby achieving a substantial saving in the total number of memory cycles required for the transference of information from punched cards to a magnetic core memory.

The same timing cycle is generally used whether information is to be written into a core memory or read from the memory. The total time taken by the entire timing sequence is called a "memory cycle" and consists of two periods, the first of which is called the "read time" and the second of which is called the "write time." Conventionally, during a read operation a memory information register is first cleared, information is then transferred from memory to the register during "read time" while outside information is prevented from entering the register, and the information stored in the register is subsequently retransferred to memory during "write time." Similarly, during a conventional write operation the information register is first cleared, information to be written is transferred to the register from outside during "read time" while information in memory is prevented from entering the register, and the information stored in the register is subsequently transferred to memory during "write time." Such conventional read and write operations are described, for example, in Bartee, Digital Computer Fundamentals, McGraw-Hill, 1960, at pp. 224–226; 232–234.

The present invention avoids the necessity of utilizing two memory cycles for the storage of an updated character in memory as each bit stored on a punched card is scanned. For an exemplary card having 80 columns and 12 rows of bits, 80 twelve bit characters are, as described previously, written into the memory during the scan of the first card row with one bit of each character corresponding to the bit sent from the card reader and the other 11 set to "0." During the scan of the next and succeeding rows, however, a single memory cycle is sufficient, according to the present invention, to write updated characters into the memory. Since, during the scan of the second and succeeding rows, the information previously stored in the memory always occupies bit-positions different from those of the information bits sequentially being received from the card reader, information may be transferred from the memory to an information register and from the card reader into the register during the "read time" of the same memory cycle without danger of any information being lost. Thus, the updated character may be established in the register by transfers from both the memory and the card reader and subsequently transferred to the memory, all during a single memory cycle.

Figure 2:
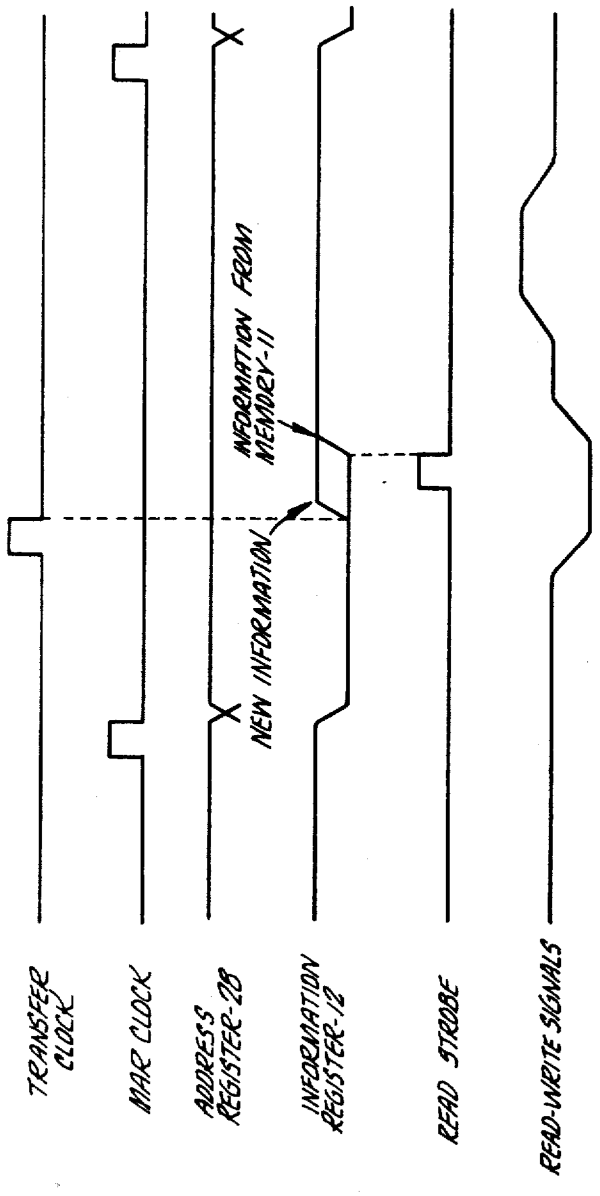

The manner of operation of the present invention and the manner in which it achieves the above and other advantages may be more clearly understood by reference to the following detailed description when considered with the drawing in which:

FIG. 1 depicts a schematic representation of a memory system employing the present invention; and FIG. 2 depicts pulse diagrams illustrating the relationship between pulses provided by various of the elements shown in FIG. 1.

FIG. 1 depicts a conventional word-addressed memory 11 and a conventional memory information register 12. Read gate 13 is connected between memory 11 and register 12 by leads 14 and 15 and write gate 16 is connected between memory 11 and register 12 by leads 17 and 18.

The present invention provides for the transfer of characters stored in the form of punched holes in cards, from such cards into memory 11. For purposes of illustration, the embodiment of the present invention, as shown in FIG. 1, will be described in connection with the transfer of information from a typical card having twelve rows and eighty columns of punched information thereon with eighty twelve-bit characters thereby being stored on the card. Such cards are ordinarily read by electro-mechanical card readers which convert the information punched into the card into a sequence of electrical signals representative of the information stored on the card. Such card readers ordinarily read information from the card a row at a time, thereby providing a sequence of electrical signals wherein signals representing a single character are separated by a number of signals equal to the number of other characters stored on the card. Therefore, in reading a card having eighty columns and twelve rows of information, a sequence of 960 signals is presented wherein successive signals depicting a single character are separated by seventy-nine intervening signals. This sequence of 960 signals is represented in FIG. 1 by the source of sequential information 19. Source 19 is connected to register 20 by lead 21 and gate 22 connects register 20 to memory information register 12 via leads 23 and 24, respectively.

During the scan of the first row of the card, eighty signals representing one bit of each of eighty characters are supplied from source 19. A conventional write operation is utilized to write eighty twelve-bit characters into memory 11 with one bit of each character corresponding to the bit supplied from source 19 and the other eleven set to "0." Information sent from source 19 during a scan of this first row is temporarily stored in register 20 from which it is transferred to information register 12 and thence to memory 11 under the control of various timing signals. Thus, counter control 25 connected to counting circuit 26 via lead 27 and memory address register 28 connected between counting circuit 26 and memory 11 by leads 29 and 30, respectively, may perform in a conventional manner to assure that information stored in register 12 is transferred to the proper locations within memory 11. Read-write driver 31 is connected to memory 11 by lead 32 to read pulse source 33 by lead 34 and to write pulse source 35 by lead 36, lead 36 also being connected to write gate 16. Driver 31 provides read and write signals during the read time and write time of each memory cycle and provides these signals in response to pulses received from sources 33 and 35. A source of memory address register clock pulses 37 is connected to memory address register 28 by lead 38 and to memory information register 12 by lead 39. A source of read strobe pulses 40 is connected to read gate 13 by lead 41 and a source of inhibit pulses 42 is connected to read gate 13 via lead 43. Finally, a source of transfer clock pulses 44 is connected to gate 22 via lead 45.

All of the elements shown in FIG. 1 are depicted in block diagram form for illustrative purposes and each represents circuitry well known in the art for performing the functions described herein.

The signals received from source 19 representative of the information stored in the first punched card row being scanned are written into memory 11 by conventional write operations. A signal from pulse source 37 enables the proper memory address, into which the next bit received from source 19 is to be stored, to be established in register 28 by control means 25 and counting circuit 26. Register 20 is utilized to store temporarily bits received from source 19 until such time that the bit is to be transferred to register 12. The signal from pulse source 37 is also utilized to clear information register 12. Subsequently, a read pulse from source 33 causes driver 31 to apply a read signal to memory 11, thereby clearing the selected cores of memory 11 which make up the particular address stored in register 28. If any of the selected cores contained "1's," a pulse is received on their sense windings. Shortly after the read signal a read strobe pulse is provided by source 40 which strobes sense amplifiers connected to the sense windings in order to transfer via gate 13 into register 12 information read from memory 11 in response to the read signal, when such a transfer is desired. However, since during a conventional write operation such a transfer is not desired, an inhibit signal is applied to gate 13 from source 42 via lead 43 simultaneously with the strobe pulse from source 40. Gate 13 is thereby disabled during the read time of the write operation and information appearing on the sense windings is lost. A signal from clock source 44 is applied to gate 22 during the read time to transfer the information temporarily stored in register 20 into memory information register 12. Thus, during the read time of the conventional write operation, the address of memory 11 into which information is to be written is cleared, the information previously in that address being lost, and the information to be written into that address is stored in register 12. During a succeeding write time of the write operation a write pulse from source 35 causes driver 31 to provide a write signal to the selected address within memory 11 and also provides a signal which enables write gate 16, thereby causing the information stored in register 12 to be transferred into the selected address of memory 11.

During the scan of the first punched card row, eighty such conventional write operations are performed after which eighty twelve-bit characters are stored in memory 11 with one bit of each character corresponding to a bit supplied from source 19 during the scan of the first row being stored in a first bit position and the eleven other bits of each character being set to "0."

During the scan of the second row of the card, another eighty bits will be supplied from source 19 and these bits are to be stored in a second bit position within each of the eighty twelve-bit characters previously stored in memory 11 without destroying the information stored in the first bit position of each of these characters during the scan of the first row. This result is accomplished by the present invention with only a single memory cycle being necessary for the storage of each bit into the proper location within memory 11. Again a pulse from source 37 clears register 12 and enables control circuit 25 and counting circuit 26 to establish a proper address in memory address register 28. A subsequent pulse from source 44 enables a bit provided by source 19 during the scan of the second row and temporarily stored in register 20 to be transferred into memory information register 12. A subsequent pulse from read pulse source 33 causes driver 31 to provide a read drive signal to the selected address of memory 11 thereby clearing this address and effecting a signal on the sense winding of each core in the selected address containing a "1." Subsequently, a read strobe signal from source 40 enables the information read from the selected address of memory 11 to be stored in register 12. Thus, during the read time of this memory cycle, information is transferred into register 12 from both memory 11 and from register 20. Thus, for example, if a "1" was received from source 19 during the scan of the first row and stored in the first bit position of a particular character stored in memory 11, and source 19, during the scan of the second row, provides a "1" as the second bit of this particular character, both "1's" will be stored in register 12 during the scan of the second row and during the read time of a single memory cycle. The "1" previously stored in the first bit position of this character in memory 11 is transferred to the first bit position in register 12 and the "1" received from source 19 is stored in the second bit position of register 12. Thus, the updated character is stored in register 12 during the read time of a single memory cycle. Information previously stored in memory 11 is not lost and no confusion results because of information being transferred to register 12 from both memory 11 and register 20 during the same read time since the information transferred from memory 11 and that transferred from register 20 will always occupy different bit positions within memory information register 12. A subsequent write pulse from source 35 causes driver 31 to provide a write signal to the selected address of memory 11 and enables write gate 16 thereby causing the updated character stored in register 12 to be transferred into the proper address of memory 11.

Thus, it may be seen that the present invention enables information stored in punched card form to be transferred into a magnetic core memory without requiring two memory cycles for the transfer of each bit of the second and all succeeding rows of the card.

FIG. 2 depicts timing diagrams showing the time relationship of several of the operations previously described. Thus, a signal from pulse source 37, shown in the second line, is shown by the third line to establish a new address in memory address register 28 and by the fourth line to clear memory information register 12. A subsequent pulse from transfer clock pulse source 44, shown in the first line, causes new information stored in register 20 to be transferred to memory information register 12, as shown in the fourth line. A subsequent pulse from read strobe pulse source 40, shown in the fifth line, and the read signal from source 31, shown in the sixth line, are effective to transfer the information previously stored in memory 11 into memory information register 12. Finally, a write drive signal, also shown in the sixth line, then transfers the accumulated information stored in register 12 into memory 11.

The new information from register 20 can be transferred into information register 12 at any time after memory information register 12 has been cleared by the pulse from source 37 and before the time when information stored in register 12 is written back into memory 11 in response to the write pulse from source 35. Thus, information from register 20 may be transferred to register 12 either prior to, simultaneously with, or subsequent to the transfer of the previously stored bits from memory 11 into register 12.

What has been described is considered to be only one illustrative embodiment of the present invention. Accordingly, it is to be understood that various and numerous other arrangements may be devised by one skilled in the art without departing from the spirit and scope of this invention.

What is claimed is:

1. A memory circuit comprising:
a word-addressed magnetic element memory;
an information register;
means for receiving sequential information signals from a punched card reader;
a first bit of a first word being stored in the memory;
a second bit of the first word being received by the receiving means;
means for transferring the first bit stored in the memory and the second bit received from the receiving means into the information register during the read time of a single memory cycle; and
means for transferring the first and second bits of the first word from the information register into the memory.

2. A memory circuit comprising:
a word-addressed memory;
an information register associated with the memory;
a source of sequential information signals representative of bits to be stored in the memory, every $n$th bit to be stored in the same address of the memory;
means for storing the first bit in the information register and means for inhibiting the transfer of bits from the memory to the information register during the read time of a first memory cycle;
means for transferring the first bit from the information register to a predetermined address of the memory during the write time of the first memory cycle;
the storing means storing the $(n+1)$th bit in the information register during the read time of a second memory cycle;
means for transferring the first bit from the predetermined address of the memory into the information register during the read time of the second memory cycle; and
the transferring means transferring the first and the $(n+1)$th bits from the information register into the predetermined address of the memory.

3. A memory circuit comprising:
a word-addressed magnetic core memory;
an information register associated with the memory;
a source of $m.n$ sequential information signals representative of a sequence of bits comprising $n$ characters to be stored in the memory, every $n$th bit being part of the same character;
register means for temporarily storing bits received from the signal source;
means for transferring the first bit of the sequence from the temporary register to the information register and means for inhibiting the transfer of bits from the memory to the information register during the read time of a first memory cycle;
means for transferring the first bit from the information register to a predetermined address of the memory during the write time of the first time memory cycle;
the first mentioned transferring means transferring the $(n+1)$th bit from the temporary register to the information register during the read time of a second memory cycle;
means for transferring the first bit from the predetermined address of the memory into the information register during the read time of the second memory cycle; and
the second mentioned transferring means transferring the first and the $(n+1)$th bits from the information register into the predetermined address of the memory during the write time of the second memory cycle.

4. A memory circuit according to claim 3 in which the $m.n$ sequential information signals are representative of $n$ $m$-bit characters stored in $n$ columns and $m$ rows of a punched card.

5. A memory circuit according to claim 4 in which $m=12$ and $n=80$.

6. A memory circuit according to claim 3 in which:
the first mentioned transferring means transfers the $(n+1)$th bit from the temporary register to the information register before the third mentioned transferring means transfers the first bit from the predetermined address of the memory into the information register.

7. A memory circuit according to claim 3 in which:
the first mentioned transferring means and the third mentioned transferring means simultaneously transfer the $(n+1)$th bit from the temporary register to the information register and the first bit from the predetermined address of the memory to the information register, respectively.

8. A memory circuit according to claim 3 in which:
the third mentioned transferring means transfers the first bit from the predetermined address of the memory into the information register before the first mentioned transferring means transfers the $(n+1)$th bit from the temporary register to the information register.

9. In a word-addressed memory system including a source of $m.n$ sequential information signals representative of a sequence of bits comprising $n$ characters to be stored in the memory, every $n$th bit being part of the same character, the improvement comprising:
register means for temporarily storing bits received from the signal source;
means for individually transferring the first $n$ bits of the sequence from the temporary register to the information register during the read times of the first $n$ memory cycles, respectively;
means for inhibiting the transfer of bits from the memory to the information register during the read times of the first $n$ memory cycles;
means for individually transferring the first $n$ bits from the information register to the first bit-position of predetermined $n$ addresses of the memory, respectively, during the write times of the first $n$ memory cycles, respectively;
the first mentioned transferring means individually transferring the second $n$ bits of the sequence from the temporary register to the information register during the read times of the second $n$ memory cycles, respectively;
means for transferring the first $n$ bits from the predetermined $n$ addresses, respectively, into the information register during the read times of the second $n$ memory cycles, respectively, and;
the second mentioned transferring means individually transferring the first $n$ bits from the information register to the first bit position of the predetermined $n$ addresses, respectively, and individually transferring the second $n$ bits from the information register to the second-bit position of the predetermined $n$ addresses, respectively, during the write times of the second $n$ memory cycles, respectively.

10. A memory circuit comprising:
a word-addressed magnetic core memory;
an information register associated with the memory;
a source of $m.n$ sequential information signals representative of a sequence of bits comprising $n$ characters to be stored in the memory, every $n$th bit being part of the same character;
register means having $m$ bit positions for temporarily storing bits received from the signal source;
means for individually transferring the $m$th $n$ bits of the sequence from the temporary register to the $m$th bit position of the information register during the read times of the $m$th $n$ memory cycles, respectively;
means for transferring bits stored in the first $(m-1)$ bit positions of $n$ predetermined addresses of the memory into the first $(m-1)$ bit positions of the information register during the read times of the $m$th $n$ memory cycles, respectively; and
means for transferring the $m$ bits stored in the information register into the first $m$ bit positions of the predetermined $n$ addresses during the write times of the $m$th $n$ memory cycles, respectively.

References Cited

UNITED STATES PATENTS

| | | | |
|---|---|---|---|
| 3,083,903 | 4/1963 | Larson | 340—172.5 X |
| 3,138,782 | 6/1964 | Estrems et al. | 340—172.5 |
| 3,229,080 | 1/1966 | Ward | 340—172.5 X |

PAUL J. HENON, *Primary Examiner.*

P. R. WOODS, *Assistant Examiner.*